May 25, 1926.   1,585,633
R. F. AGNEW
ROAD GRADER
Filed May 29, 1924   4 Sheets-Sheet 4

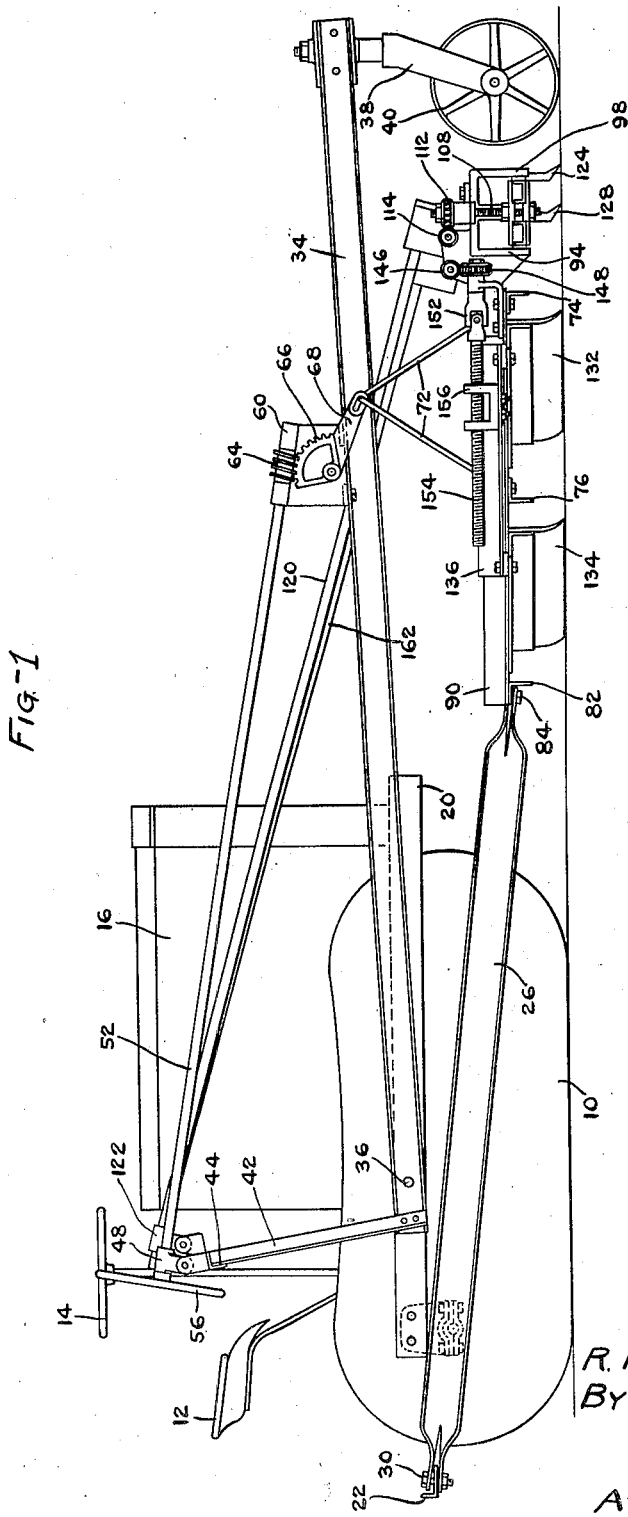

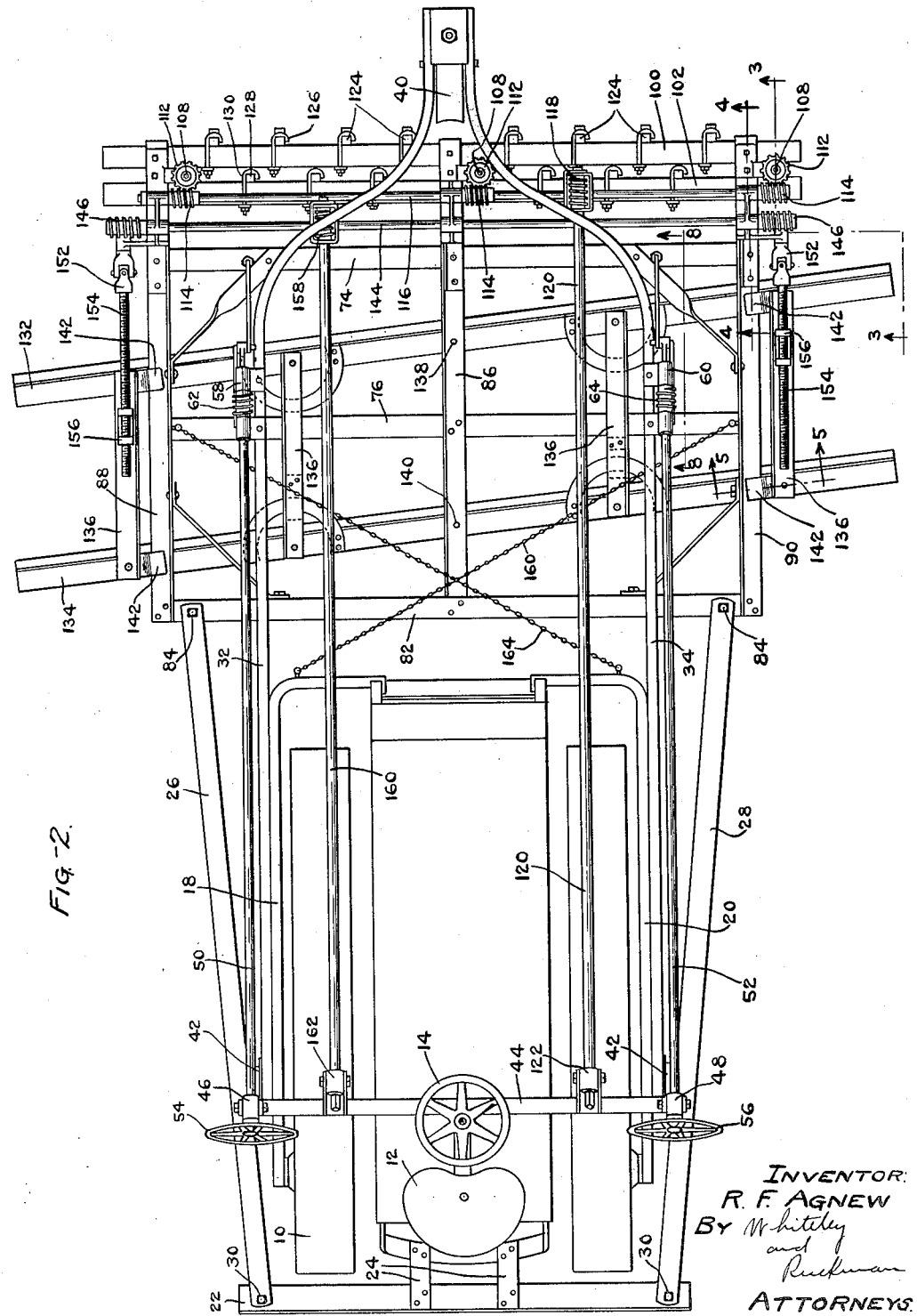

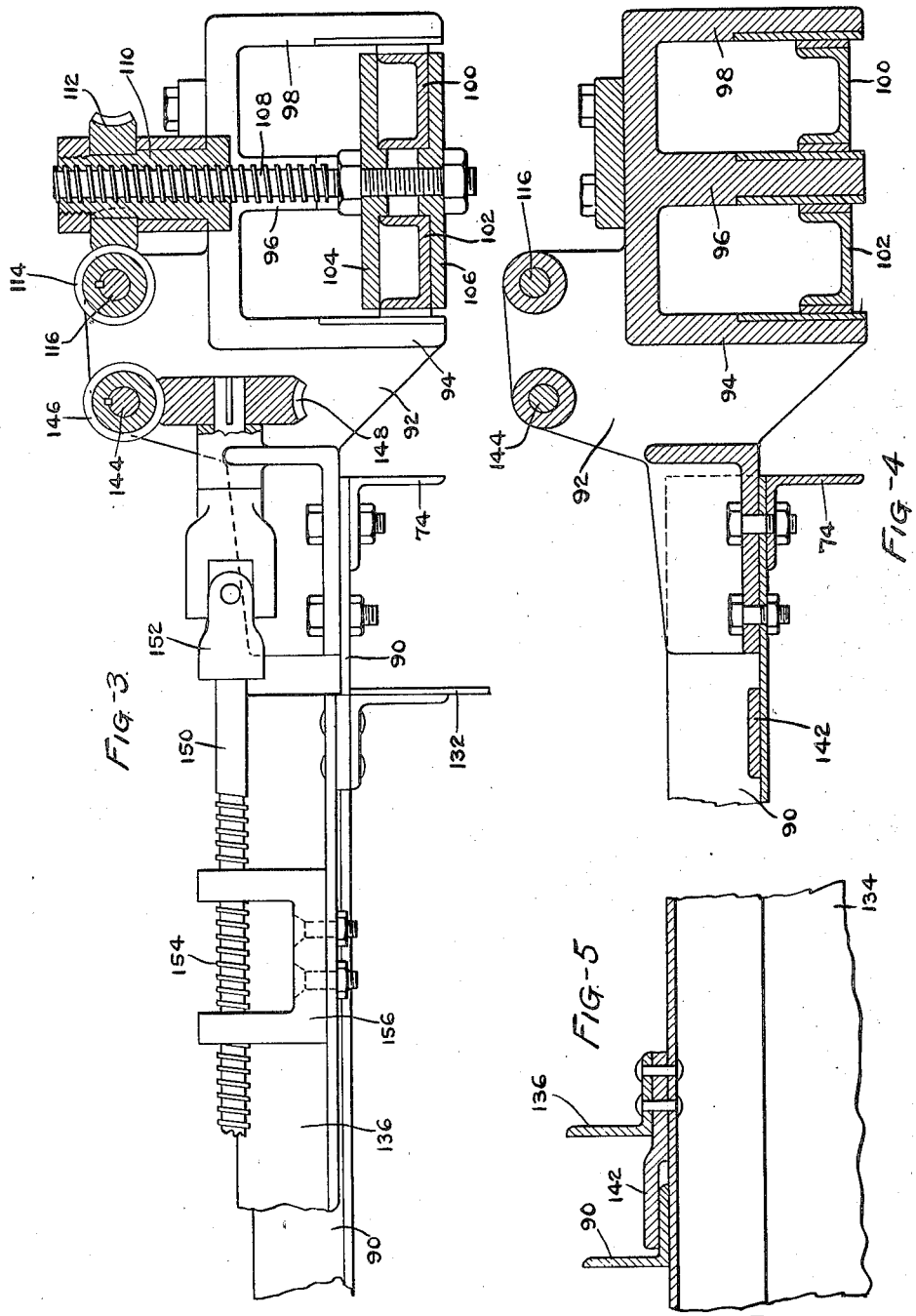

INVENTOR:
R. F. AGNEW.
BY Whiteley and Buckman
ATTORNEYS.

Patented May 25, 1926.

1,585,633

UNITED STATES PATENT OFFICE.

RICHARD F. AGNEW, OF MINNEAPOLIS, MINNESOTA.

ROAD GRADER.

Application filed May 29, 1924. Serial No. 716,823.

My invention relates to road graders and among the objects, are to provide a machine of this character which may be readily attached to and detached from a tractor and which may be conveniently operated by one man and which embodies two parallel scraper blades and a plurality of scarifier teeth which are rigidly held by supporting means which may be adjusted up and down independently of the scraper blades.

The full objects and advantages of my invention will appear in connection with the detailed description thereof and the novel features embodied in my inventive idea will be particularly pointed out in the claims.

Figure 6:
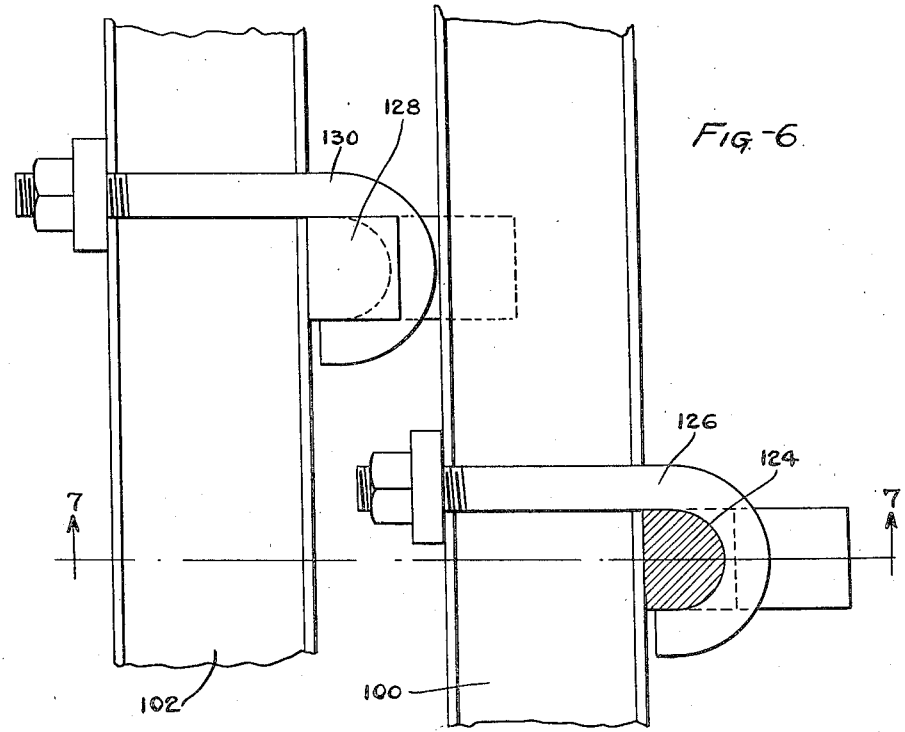
Figures 7, 8:
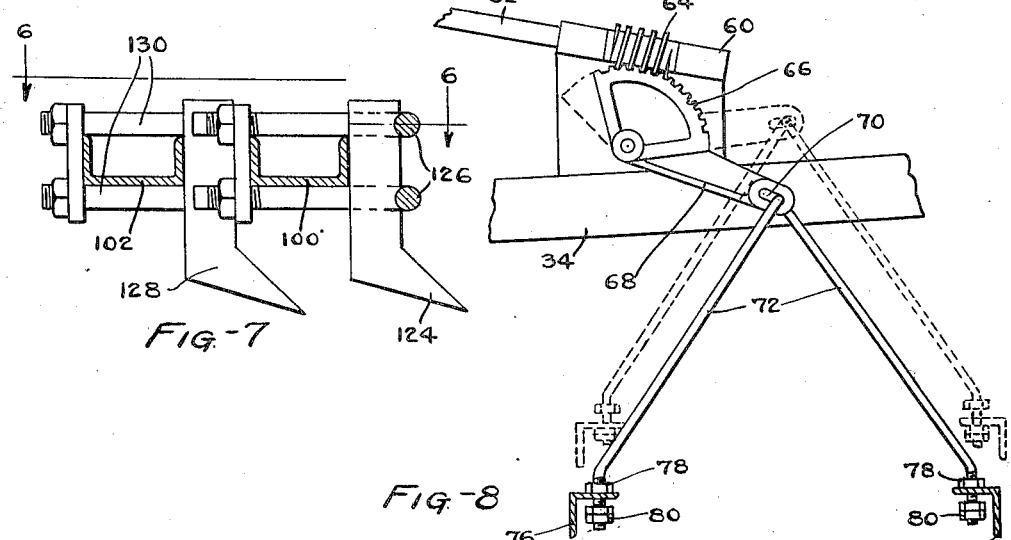

In the accompanying drawings which illustrate one form in which my invention may be embodied, Fig. 1 is a view of the machine in side elevation. Fig. 2 is a top plan view. Fig. 3 is a view in section on the line 3—3 of Fig. 2. Fig. 4 is a view in section on the line 4—4, of Fig. 2. Fig. 5 is a view in section on the line 5—5 of Fig. 2. Fig. 6 is an enlarged view in section on the line 6—6 of Fig. 7. Fig. 7 is a view in section on the line 7—7 of Fig. 6. Fig. 8 is a view in section on the line 8—8 of Fig. 2.

Referring to the construction shown in the drawings, the numeral 10 designates a caterpillar tractor which is provided with the customary seat 12, steering wheel 14 and internal combustion engine 16. Secured to the sides of the tractor are two frame members, 18 and 20, which may be left permanently attached. The road grader is removably attached to these frame members and to the tractor by means which will now be described. A transverse angle bar 22 is attached to the rear of the tractor by plates 24, which are bolted to the tractor. Lower frame members 26 and 28 are secured to the ends of the bar 22 in the manner best shown in Fig. 1. The rear ends of the members 26 and 28 are split so as to straddle the bar 22 and are secured thereto by bolts 30, the split at the ends of the members 26 and 28 being of sufficient width to permit up-and-down movement of said members. Upper frame members 32 and 34 are pivotally attached at their rear ends to the members 18 and 20 by bolts 36. The forward ends of the frame members 32 and 34 are curved toward each other as shown in Fig. 2 and carry a downwardly extending fork 38 at the lower end of which a ground wheel 40 is rotatably mounted. Standards 42 extend up from the rear ends of the members 32 and 34 and a crossbar 44 is secured to the upper ends of these standards. Pivotally secured to the ends of the bar 44 are bearings 46 and 48 in which the rear ends of shafts 50 and 52 are mounted, hand wheels 54 and 56 being secured to these shafts adjacent to said bearings. The forward ends of the shafts 50 and 52 are mounted in bearings 58 and 60 which extend up from the frame members 32 and 34 and are provided with worms 62 and 64 which engage segmental gears 66 as shown in Figs. 1 and 8. Secured for movement with the gears 66 are forwardly extending projections 68, whose free ends are provided with slots 70. The middle portions of the inverted V-shaped rods 72 pass through the slots 70 and the ends of these rods pass through transverse angle-bars 74 and 76, being secured thereto for a limited amount of relative sliding movement by upper nuts 78 and lower nuts 80. The transverse bars 74 and 76 constitute part of a scraper frame which has a rear transverse bar 82 attached to the forward split ends of the lower frame members 26 and 28. The split ends straddle the bar 82 and are secured thereto by bolts 84, the split being of sufficient width to permit a limited amount of up-and-down movement of the bar 82. The scraper frame has a middle longitudinal angle bar 86 and side longitudinal angle bars 88 and 90 on the forward ends of which are enlarged members 92, which are provided with three downwardly extending fins 94, 96 and 98 as best shown in Fig. 4. A transverse bar 100 is adapted to slide up and down in the space between the fins 96 and 98 while a transverse bar 102 is adapted to slide up and down in the space between the fins 94 and 96. The bars 100 and 102 are clamped together between upper plates 104 and lower plates 106 as best shown in Fig. 3, these plates being held together by nuts on the lower ends of threaded rods, 108, the threads of which engage threads in nut members 110 rotatively mounted in bearings carried by the enlarged members 92. Worm gears 112 secured to the nut members 110 engage worms 114 secured to a transverse shaft 116 to which is secured a worm gear in mesh with a worm 118 secured to the forward end of a shaft 120, whose rear end is mounted in a bearing 122 carried by the cross bar 44, at the rear of the machine. The rear end of the shaft 120 is squared to receive a wrench by means of which this shaft may be rotated in either direction to raise and lower the bars 100 and 102. A plurality of scarifier teeth 124 are secured to the bar 100 by clamps 126 as best shown in Fig. 7, while a plurality of scarifier teeth 128 are secured to the bar 102 by clamps 130. Two scrapers 132 and 134 are secured together and maintained in parallelism by a number of links 136, these scrapers being pivotally attached by bolts 138 and 140, to the middle longitudinal bar 86 of the scraper frame. Lugs 142 secured to the upper sides of the two scrapers slidably engage the horizontal flanges of the angle members 88 and 90 of the scraper frame. The inclination of the scrapers may be varied by means of a transverse shaft 144 mounted in bearings on the enlarged members 92, this shaft having worms 146 secured to its ends which mesh with worm wheels 148 secured to the forward end of shafts 150 having universal joints 152. The shafts 150 have screw-threaded rear portions 154 which engage in screw-threaded holes in yoke members 156 secured to the outside links 136. The shaft 144 is connected by worm gearing 158 to a longitudinal shaft 160 whose rear end is rotatively mounted in a bearing 162 carried by the cross bar 44 at the rear of the machine. The rear end of the shaft 160 is squared to receive a wrench by means of which this shaft may be rotated in either direction to change the inclination of the scrapers. A pair of diagonally extending chains 164 and 166 secured at their rear ends to the tractor and secured at their front ends to the scraper frame as shown in Fig. 2 compel the scraper frame to turn in the same direction in which the tractor is steered.

The operation and advantages of my invention will be readily understood in connection with the foregoing description. The machine may be readily guided and manipulated by a single operator from his position on the seat at the rear of the machine. The scraper frame, together with the scarifier teeth, may be raised and lowered at either end or as an entirety by means of the hand wheels 54 and 56. The scarifier teeth may be raised and lowered independently of the scraper blades by means of the shaft 120 and on account of the manner in which the scarifier teeth are mounted for sliding movement, they will be rigidly held in all of their positions. By means of the shaft 160, the angular position of the two scrapers may be varied horizontally so that they may be given any desired inclination toward either the right or the left. On account of the link connections between the two scrapers, they will always be maintained parallel and the use of two parallel scrapers is much more effective in smoothing roads than a single scraper. The grader may be readily attached to and detached from the tractor so that the latter is available for other purposes. The loose connections in the means by which the scraper frame is supported provide for upward movement thereof so that the parts will not be subjected to a strain sufficient to cause breakage.

I claim—

1. A road grader comprising a frame, two scrapers pivotally mounted on said frame, a pair of links connecting said scrapers on opposite sides of their pivots, members having screw threaded holes carried by said links, longitudinally extending threaded shafts engaging said holes, a transverse shaft mounted on said frame, gears connecting said threaded shafts with said transverse shaft, a shaft extending longitudinally to a position within reach of the driver and gears connecting said last mentioned shaft and said transverse shaft.

2. A road grader comprising a frame, two scrapers pivotally mounted on said frames, a pair of links connecting said scrapers on opposite sides of their pivots, yoke members whose branches have screw-threaded holes secured to said links, longitudinally extending threaded shafts engaging said holes, universal couplings for said shafts, a transverse shaft mounted on said frame, work gearing connecting said threaded shafts with said transverse shaft, a shaft extending longitudinally to a position within reach of the driver, and worm gearing connecting said last mentioned shaft and said transverse shaft.

3. A road grader comprising upper frame members, means for detachably and pivotally connecting the rear ends of said frame members to a tractor, a ground wheel mounted at the front of said frame members, lower frame members, means for detachably connecting the rear ends of said lower frame members to the tractor, a scraper support attached to the front ends of said lower frame members, a scraper carried by said support, and means supported by said upper frame members for raising and lowering said scraper support.

4. A road grader comprising upper frame members, means for detachably and pivotally connecting the rear ends of said frame members to a tractor, a ground wheel mounted at the front of said frame members, lower frame members, means for detachably connecting the rear ends of said lower frame members to the tractor, a scraper support attached to the front ends of said lower frame members, a scraper carried by said support, means for permitting a limited up-and-down movement of said support relatively to said upper frame members, and means supported by said upper frame members for raising and lowering said scraper support.

In testimony whereof I hereunto affix my signature.

RICHARD F. AGNEW.